(12) United States Patent
Sternberger

(10) Patent No.: US 7,600,371 B2
(45) Date of Patent: Oct. 13, 2009

(54) THRUST REVERSERS INCLUDING SUPPORT MEMBERS FOR INHIBITING DEFLECTION

(75) Inventor: Joe E. Sternberger, Wichita, KS (US)

(73) Assignee: The Boeing Company, Chicago, IL (US)

( * ) Notice: Subject to any disclaimer, the term of this patent is extended or adjusted under 35 U.S.C. 154(b) by 507 days.

(21) Appl. No.: 11/252,444

(22) Filed: Oct. 18, 2005

(65) Prior Publication Data

US 2007/0084964 A1    Apr. 19, 2007

(51) Int. Cl.
*F02K 3/02*    (2006.01)
(52) U.S. Cl. .............. 60/226.2; 239/265.31; 244/110 B
(58) Field of Classification Search ............... 60/226.2, 60/230; 244/110 B; 239/265.25–265.31
See application file for complete search history.

(56) References Cited

U.S. PATENT DOCUMENTS

| | | | |
|---|---|---|---|
| 3,500,644 A * | 3/1970 | Hom et al. ............ | 60/229 |
| 3,600,023 A | 8/1971 | Gudde | |
| 3,762,667 A | 10/1973 | Pender | |
| 3,824,785 A * | 7/1974 | Soligny et al. ......... | 60/226.2 |
| 4,044,973 A | 8/1977 | Moorehead | |
| 4,283,028 A | 8/1981 | Wilke | |
| 4,286,727 A | 9/1981 | Limoncelli | |
| 4,365,775 A | 12/1982 | Glancy | |
| 4,549,708 A | 10/1985 | Norris | |
| 4,557,441 A | 12/1985 | Aspinall | |
| 4,585,189 A | 4/1986 | Buxton | |
| 4,629,146 A | 12/1986 | Lymons | |
| 4,679,750 A | 7/1987 | Burhans | |
| 4,683,717 A | 8/1987 | Naud et al. | |
| 4,731,991 A * | 3/1988 | Newton ............... | 60/226.2 |
| 4,894,985 A | 1/1990 | Dubois et al. | |
| 5,003,770 A | 4/1991 | Schegerin et al. | |
| 5,076,514 A | 12/1991 | Melcher | |
| 5,083,426 A | 1/1992 | Layland | |
| 5,090,197 A | 2/1992 | Dubois et al. | |
| 5,112,242 A | 5/1992 | Choy et al. | |
| 5,239,822 A | 8/1993 | Buchacher | |
| 5,306,118 A * | 4/1994 | Holmes ............... | 415/146 |
| 5,307,623 A | 5/1994 | Antuna et al. | |
| 5,313,788 A | 5/1994 | Wright et al. | |
| 5,369,954 A | 12/1994 | Stuart | |
| 5,381,986 A | 1/1995 | Smith et al. | |
| 5,524,431 A | 6/1996 | Brusson et al. | |

(Continued)

FOREIGN PATENT DOCUMENTS

EP    0 926 333 A1    6/1999

(Continued)

*Primary Examiner*—Ted Kim
(74) *Attorney, Agent, or Firm*—Perkins Coie LLP

(57) ABSTRACT

Aircraft systems having thrust reversers with support members are disclosed herein. In one embodiment, an aircraft system includes a thrust reverser having a nozzle inner wall, a nozzle outer wall radially outward of the inner wall, and a blocker door carried by the outer wall. The blocker door is movable between a deployed position and a stowed position. The thrust reverser further includes a support member extending between a forward section of a nozzle inner wall and a forward section of the nozzle outer wall. The support member is positioned such that at least a portion of the support member is forward of the blocker door when the blocker door is in the stowed position.

23 Claims, 4 Drawing Sheets

U.S. PATENT DOCUMENTS

| | | |
|---|---|---|
| 5,655,360 A | 8/1997 | Butler |
| 5,706,651 A | 1/1998 | Lillibridge et al. |
| 5,788,659 A | 8/1998 | Haas |
| 5,791,138 A | 8/1998 | Lillibridge et al. |
| 5,794,434 A | 8/1998 | Szupkay |
| 5,819,528 A | 10/1998 | Masson et al. |
| 5,863,014 A * | 1/1999 | Standish ................. 244/110 B |
| 5,904,041 A | 5/1999 | Dhainault et al. |
| 5,915,765 A | 6/1999 | Sternberger |
| 5,943,856 A | 8/1999 | Lillibridge et al. |
| 5,983,625 A | 11/1999 | Gonidec et al. |
| 5,987,880 A | 11/1999 | Culbertson |
| 6,021,636 A | 2/2000 | Johnson et al. |
| 6,032,901 A | 3/2000 | Carimali et al. |
| 6,036,238 A | 3/2000 | Lallament |
| 6,059,231 A | 5/2000 | Dessenberger, Jr. |
| 6,065,285 A | 5/2000 | Gonidec et al. |
| 6,145,786 A | 11/2000 | Baudu et al. |
| 6,148,607 A | 11/2000 | Baudu et al. |
| 6,151,886 A | 11/2000 | Vauchel et al. |
| 6,170,254 B1 | 1/2001 | Cariola |
| 6,173,807 B1 | 1/2001 | Welch et al. |
| 6,189,832 B1 | 2/2001 | Jackson |
| 6,220,546 B1 | 4/2001 | Klamka et al. |
| 6,227,485 B1 | 5/2001 | Porte et al. |
| 6,237,325 B1 | 5/2001 | Hogie et al. |
| 6,293,495 B1 | 9/2001 | Aten et al. |
| 6,340,135 B1 | 1/2002 | Barton |
| 6,517,027 B1 | 2/2003 | Abruzzese |
| 6,546,715 B1 * | 4/2003 | Blevins et al. ............. 60/226.2 |
| 6,568,172 B2 | 5/2003 | Jannetta et al. |
| 6,764,045 B2 | 7/2004 | Sternberger |
| 6,895,742 B2 | 5/2005 | Lair et al. |
| 6,945,031 B2 | 9/2005 | Lair |
| 7,124,981 B2 | 10/2006 | Parham |
| 2003/0066284 A1 | 4/2003 | Chakkera et al. |
| 2004/0068978 A1 | 4/2004 | Lair et al. |
| 2004/0159741 A1 | 8/2004 | Sternberger et al. |
| 2004/0206066 A1 | 10/2004 | Eschborn |
| 2006/0059886 A1 | 3/2006 | Strunk et al. |
| 2006/0277895 A1 | 12/2006 | Thornock et al. |
| 2007/0007388 A1 | 1/2007 | Harrison et al. |
| 2008/0098720 A1 | 5/2008 | Watson |

FOREIGN PATENT DOCUMENTS

| | | |
|---|---|---|
| FR | 2711187 | 4/1995 |

* cited by examiner

THRUST REVERSERS INCLUDING SUPPORT MEMBERS FOR INHIBITING DEFLECTION

TECHNICAL FIELD

The present invention is related to thrust reversers having support members for inhibiting deflection of the nozzle inner wall and/or disengagement of the inner V-blade and the inner V-groove.

BACKGROUND

Jet aircraft include nacelles for housing the engines and coupling the engines to the wings. The nacelles are contoured to reduce aerodynamic drag during operation of the aircraft. Conventional nacelles include a pair of thrust reverser cowlings that form a clam-shaped structure which wraps around the aircraft engine. During aircraft operation, the thrust reverser cowlings must be capable of withstanding considerable hoop loads caused by the high pressure of the jet exhaust stream flowing therein.

Conventional thrust reverser cowlings are pivotably coupled to a pylon at the upper portion of the nacelle. The thrust reverser cowlings can accordingly be pivoted upward to access the engine for maintenance and/or repair. During aircraft operation, the thrust reverser cowlings are closed and their distal ends are positioned proximate to each other at the lower portion of the nacelle. The distal ends of the thrust reverser cowlings can include a latching mechanism for locking the cowlings together during engine operation.

One drawback of conventional thrust reverser cowlings is that the inner walls may not be sufficiently stiff to prevent significant deflection when used with high-thrust engines. For example, during a rejected take-off, a high-thrust engine places an increased load on the blocker doors of the thrust reverser, which may cause the inner walls to deflect. Significant deflection of the inner walls of the thrust reverser changes the load path between the engine and the thrust reverser, which can damage components in the engine and thrust reverser. Due to space constraints in certain applications, it may not be possible to increase the thickness of the inner walls to preclude significant deflection. Accordingly, there is a need to inhibit deflection of the inner walls of the thrust reverser.

SUMMARY

Several aspects of the invention are directed to aircraft systems having thrust reversers with support members. An aircraft system in accordance with one embodiment includes a thrust reverser having a nozzle inner wall, a nozzle outer wall radially outward of the inner wall, and a blocker door carried by the nozzle outer wall. The blocker door is movable between a deployed position and a stowed position. The thrust reverser further includes a support member extending between a forward section of the nozzle inner wall and a forward section of the nozzle outer wall. The support member is positioned such that at least a portion of the support member is forward of the blocker door when the blocker door is in the stowed position.

In one aspect of this embodiment, the aircraft system further includes a torque box or other fixed structure at the nozzle outer wall. Moreover, the nozzle inner wall may further include a first inner wall panel and a second inner wall panel opposite the first inner wall panel with a nozzle gas flow path located between the first and second inner wall panels. The first and second inner wall panels each include an upper portion, a lower portion, and an arcuate portion extending between the upper and lower portions. The support member can include a first end portion attached to the arcuate portion of the first or second inner wall panel and a second end portion attached to the fixed structure. The aircraft system may further include a plurality of support members extending between the nozzle inner and outer walls.

In another embodiment, an aircraft system includes a cascade thrust reverser having a first inner wall panel, a second inner wall panel opposite the first inner wall panel, a nozzle outer wall radially outward of the first and second inner wall panels, a fixed structure radially outward of at least a portion of the nozzle outer wall, and a support member. The support member has a first end portion attached to the first or second inner wall panel and a second end portion attached at the fixed structure. The fixed structure can be a torque box or other suitable structure. The thrust reverser can further include a plurality of additional support members attached to the fixed structure and one of the inner wall panels.

In another embodiment, an aircraft system includes a fan casing and a thrust reverser attached to the fan casing. The fan casing includes a first member. The thrust reverser includes a nozzle inner wall, a second member proximate to the nozzle inner wall for engaging the first member, a nozzle outer wall radially outward of the nozzle inner wall, and means for inhibiting disengagement of the first and second members. The first member can include an inner V-groove, and the second member can include an inner V-blade. The means for inhibiting can include one or more support members extending between the nozzle inner and outer walls.

DETAILED DESCRIPTION

The following disclosure describes aircraft systems having thrust reversers with support members for inhibiting deflection of the nozzle inner wall and/or disengagement of the inner V-blade and the inner V-groove. Certain details are set forth in the following description and in FIGS. 1-5 to provide a thorough understanding of various embodiments of the invention. Other details describing well-known structures and systems often associated with thrust reversers are not set forth in the following disclosure to avoid unnecessarily obscuring the description of various embodiments of the invention. Many of the details, dimensions, angles, and other features shown in the figures are merely illustrative of particular embodiments of the invention. Accordingly, other embodiments can have other details, dimensions, and/or features without departing from the present invention. In addition, additional embodiments of the invention may be practiced without several of the details described below, or various aspects of any of the embodiments described below can be combined in different combinations.

Figure 1:
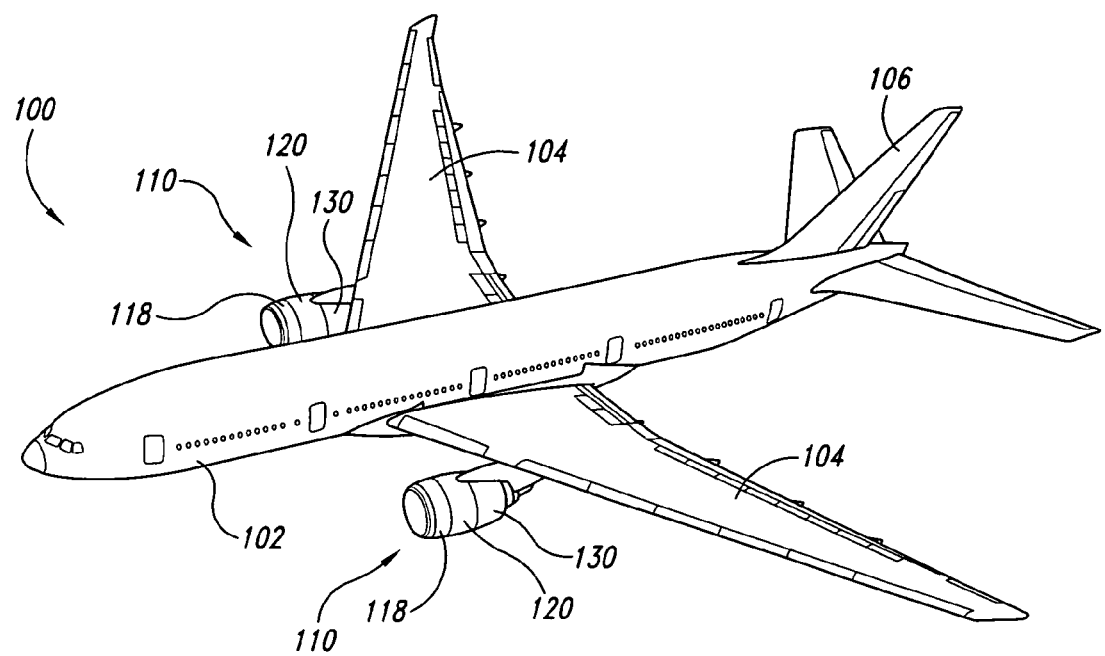
FIG. 1 is a schematic isometric view of an aircraft having a plurality of power plants in accordance with one embodiment of the invention.

A. Embodiments of Aircraft Systems Having Thrust Reversers with Support Members FIG. 1 is a schematic isometric view of an aircraft 100 having a plurality of power plants 110 in accordance with one embodiment of the invention. The aircraft 100 further includes a fuselage 102, a plurality of wings 104 attached to the fuselage 102, and a tail 106 attached to the fuselage 102. Although the illustrated power plants 110 are mounted to corresponding wings 104, in other embodiments, the power plants 110 can be coupled to the fuselage 102 and/or the tail 106. The individual power plants 110 include an inlet housing 118, a fan casing 120 coupled to the inlet housing 118, and a thrust reverser 130 coupled to the fan casing 120.

Figure 2:
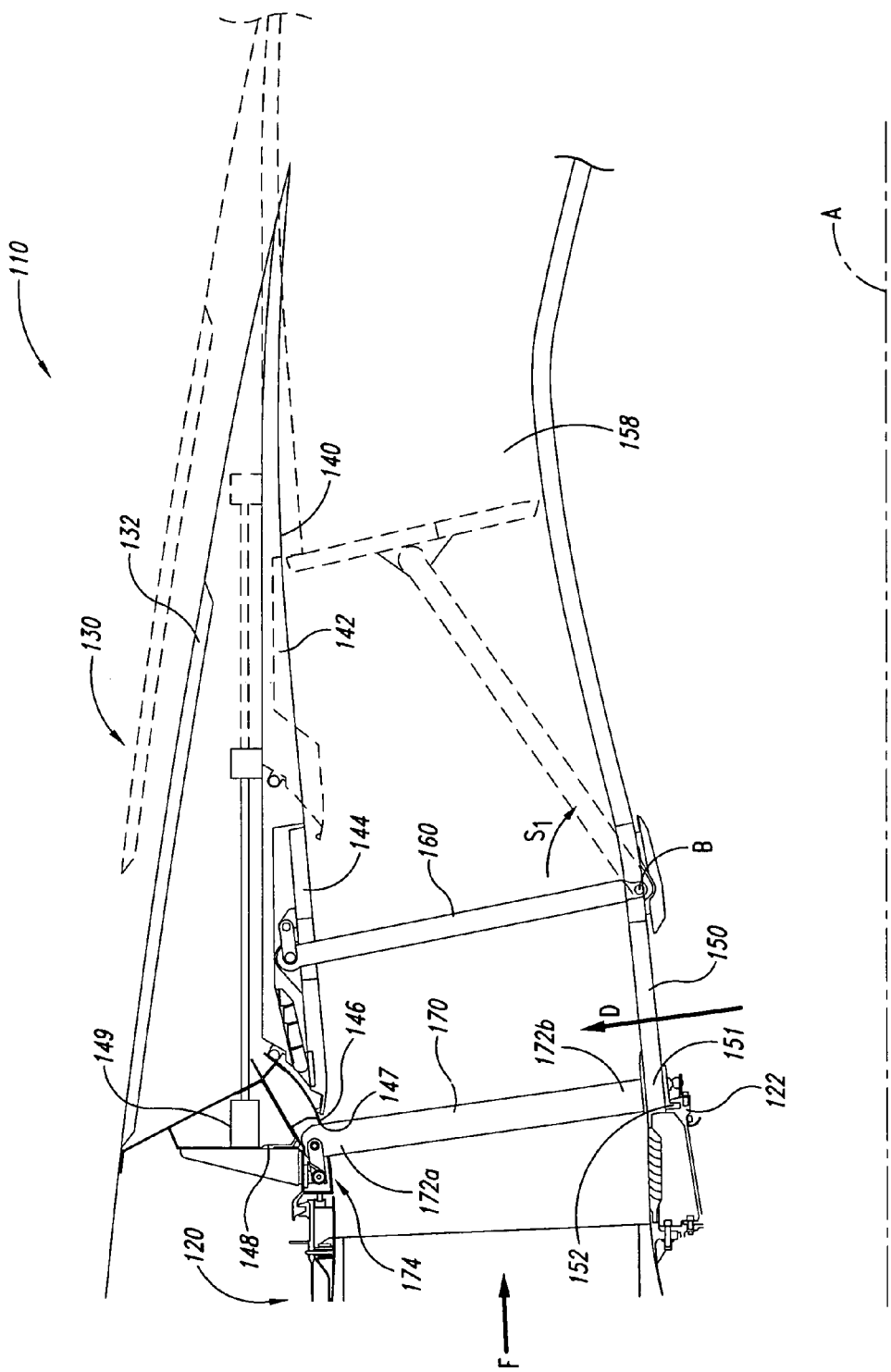
FIG. 2 is a schematic view of a portion of one of the power plants illustrated in FIG. 1.

FIG. 2 is a schematic view of a portion of one of the power plants 110 illustrated in FIG. 1. The illustrated thrust reverser 130 includes a nozzle outer wall 140 and a nozzle inner wall 150 radially inward of the nozzle outer wall 140. The illustrated nozzle outer wall 140 includes a translating wall section 142 and a bullnose fairing 146 forward of the translating wall section 142. The nozzle outer wall 140 and the nozzle inner wall 150 define a nozzle 158 through which fan gas flows in a direction F to produce forward thrust for the power plant 110. The nozzle 158 is positioned radially outward from a central axis A of the power plant 110.

The thrust reverser 130 further includes a translating cowling 132 attached to the translating wall section 142, a torque box 148, an actuator 149 attached to the translating cowling 132 and the torque box 148, a blocker door 144 carried by the translating wall section 142, and a drag link 160 extending between the blocker door 144 and the nozzle inner wall 150. The torque box 148 is a fixed, rigid member such that the actuator 149 can move the translating cowling 132 and the translating wall section 142 as a unit between a stowed position (shown in solid lines) and a deployed position (shown in broken lines). The blocker door 144 is also movable between a stowed position (shown in solid lines) and a deployed position (shown in broken lines). When the translating cowling 132, the translating wall section 142, and the blocker door 144 are in the stowed position, the nozzle outer wall 140 directs gas aftward to produce forward thrust. As the translating cowling 132 and the translating wall section 142 move toward the deployed position, the drag link 160 pivots in a direction $S_1$ about an axis B and pulls the blocker door 144 downward to the deployed position. When the translating cowling 132, the translating wall section 142, and the blocker door 144 are in the deployed position, a plurality of guide vanes (not shown) are exposed to gas flow in the nozzle 158 and the blocker door 146 obstructs gas flow through the nozzle 158 so that at least a portion of the flow is diverted radially outward through the guide vanes. The guide vanes change the direction of the gas flow to generate reverse thrust to assist in decelerating the aircraft 100 (FIG. 1).

The illustrated thrust reverser 130 further includes an inner V-blade 152 projecting radially inward from a forward portion 151 of the nozzle inner wall 150 and a rigid support member 170 extending between the nozzle outer wall 140 and the nozzle inner wall 150. The inner V-blade 152 is received in an inner V-groove 122 of the fan casing 120. The inner V-groove 122 and the inner V-blade 152 couple the fan casing 120 and the thrust reverser 130 together and transfer loads between the fan casing 120 and the thrust reverser 130. The illustrated support member 170 includes a first end portion 172a coupled to the torque box 148 with a coupling mechanism 174 and a second end portion 172b attached to the forward portion 151 of the nozzle inner wall 150 proximate to the inner V-blade 152. Unlike the drag link 160 that moves with the blocker door 144, the support member 170 is positioned at least partially forward of the blocker door 144 and does not move a significant distance during engine operation. The rigid support member 170 accordingly inhibits deflection of the nozzle inner wall 150 in a direction D and prevents disengagement of the inner V-groove 122 and the inner V-blade 152.

Figure 3:
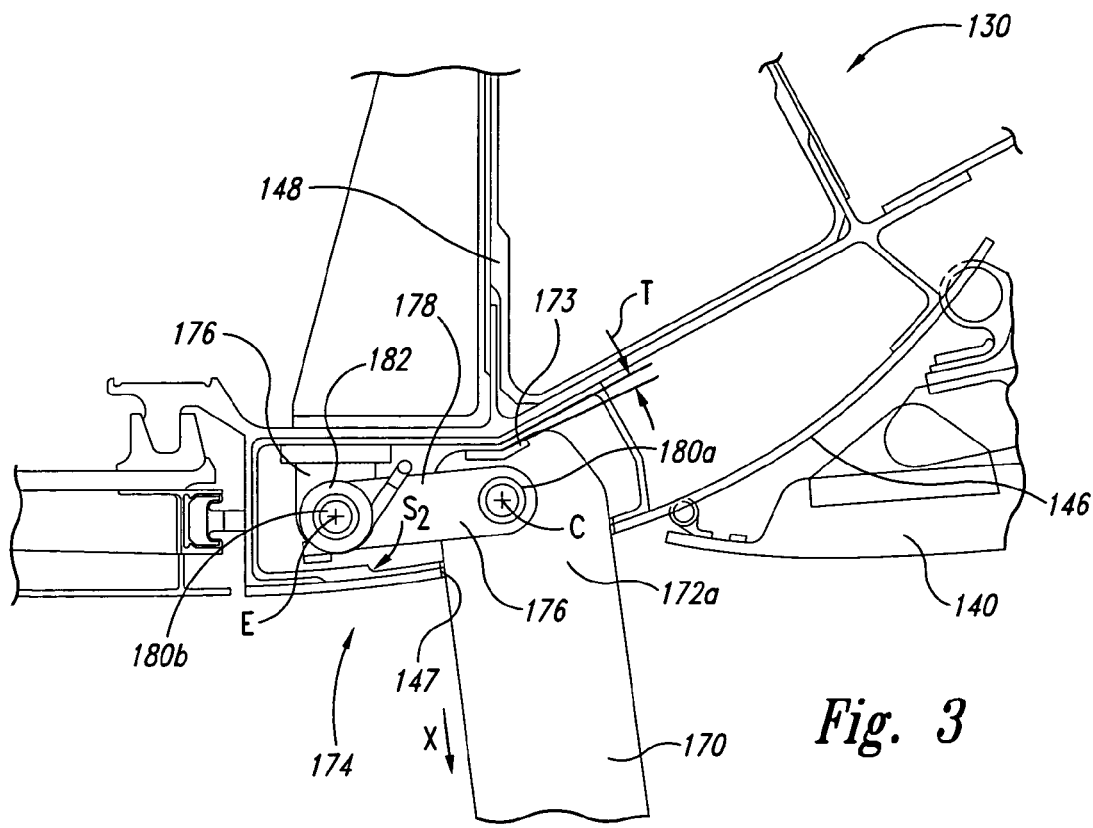
FIG. 3 is an enlarged schematic view of a coupling mechanism illustrated in FIG. 2.

FIG. 3 is an enlarged schematic view of the first end portion 172a of the support member 170 and the coupling mechanism 174 illustrated in FIG. 2. In the illustrated embodiment, the bullnose fairing 146 includes an aperture 147 sized to receive the first end portion 172a of the support member 170 so that the first end portion 172a can be attached to the coupling mechanism 174. The illustrated coupling mechanism 174 includes a mounting bracket 176 rigidly attached to the torque box 148 and a link 178 pivotably attached to the support member 170 and the mounting bracket 176. Specifically, the link 176 has (a) a first end portion 180a rotatably coupled to the first end portion 172a of the support member 170 and pivotable about an axis C, and (b) a second end portion 180b rotatably coupled to the mounting bracket 176 and pivotable about an axis E.

The coupling mechanism 174 can further include an urging member 182 configured to urge the link 178 to pivot in a direction $S_2$ about the axis E, which urges the support member 170 in a direction X. The illustrated coupling mechanism 174 accordingly spaces the distal end of the first end portion 172a apart from the torque box 148 by a gap T. The gap T can be approximately 0.1 inch, greater than 0.1 inch, or less than 0.1 inch. The distal end of the first end portion 172a may include a resilient member 173 to prevent damage to the torque box 148 and/or the support member 170 when the support member 170 contacts the torque box 148. In the illustrated embodiment, the gap T advantageously provides clearance to facilitate installation of the support member 170, and the urging member 182 advantageously provides a preload to avoid excessive wear of the support member 170 in a high vibration environment. In other embodiments, such as the embodiment illustrated in FIG. 5, the support member 170 may not be attached to the torque box 148 with a movable coupling mechanism 174. In additional embodiments, the support member 170 can be attached to another fixed structure rather than the torque box 148.

One feature of the thrust reverser 130 illustrated in FIGS. 2 and 3 is that the rigid support member 170 is attached to the torque box 148 and the nozzle inner wall 150. An advantage of this feature is that the support member 170 prevents or at least inhibits the nozzle inner wall 150 from deflecting radially outwardly in the direction D and, consequently, disengagement of the inner V-groove 122 and the inner V-blade 152. If the inner V-blade 152 were to decouple from the inner V-groove 122, the load path from the thrust reverser 130 to the fan casing 120 would be altered and components could be damaged. Accordingly, an aircraft with the illustrated thrust reverser 130 may include a high-thrust engine without causing excessive deflection in the nozzle inner wall 150 due to the increased loads.

Figure 4:
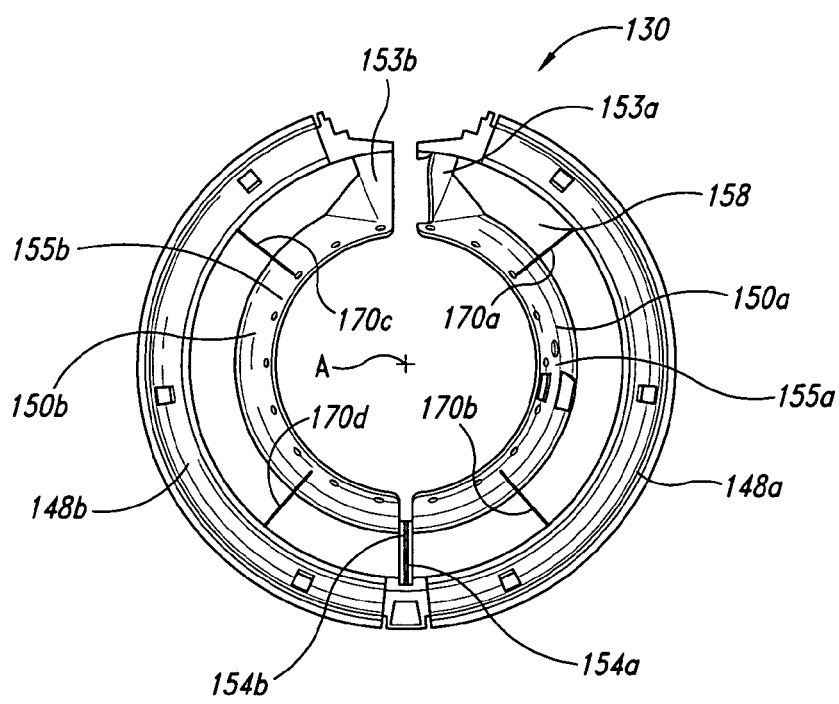
FIG. 4 is a schematic front view of several components of a thrust reverser in accordance with one embodiment of the invention.

FIG. 4 is a schematic front view of several components of the thrust reverser 130 configured in accordance with one embodiment of the invention. The illustrated nozzle inner wall 150 includes a first panel 150a and a second panel 150b opposite the first panel 150a. The first and second panels 150a-b each include an upper portion 153a-b, a lower portion 154a-b, and an arcuate portion 155a-b extending between the upper portions 153a-b and lower portions 154a-b. The upper portions 153a-b form an upper bifurcation, the lower portions 154a-b form a lower bifurcation, and the arcuate portions 155a-b form a barrel through which engine gases pass during operation.

The illustrated thrust reverser 130 has a plurality of support members 170 attached to the first and second panels 150a-b. For example, first and second support members 170a-b extend between a first torque box 148a and the arcuate portion 155a of the first panel 150a, and third and fourth support members 170c-d extend between a second torque box 148b and the arcuate portion 155b of the second panel 150b. The first, second, third, and fourth support members 170a-d are oriented such that if the members 170a-d were projected radially inward, each projection would intersect the central axis A of the thrust reverser 130. Although the illustrated thrust reverser 130 includes four support members 170 projecting radially outward from the arcuate portions 155a-b of the first and second panels 150a-b, in other embodiments, the thrust reverser can have a different number of support members and/or the support members can have different orientations.

B. Additional Embodiments of Thrust Reversers with Support Members

Figure 5:
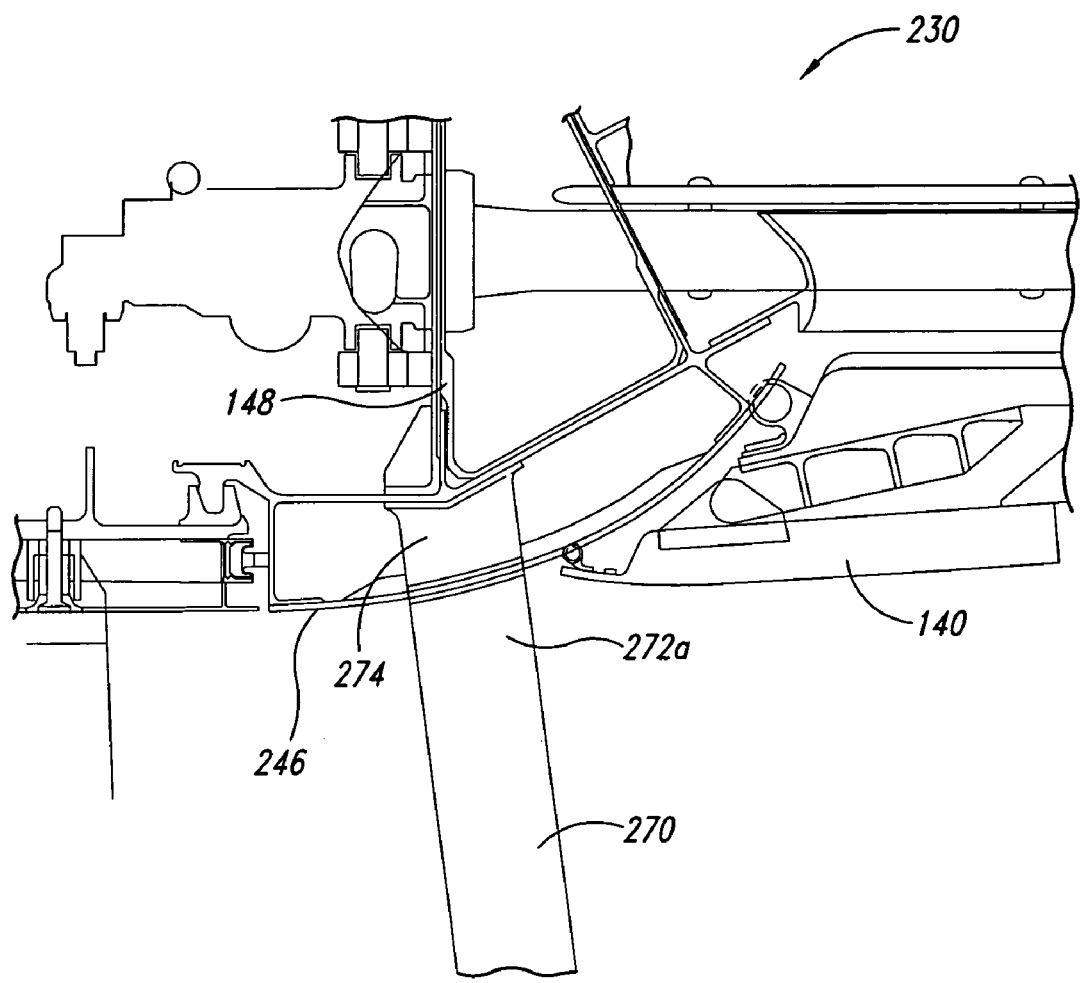
FIG. 5 is a schematic view of a thrust reverser having a support member in accordance with another embodiment of the invention.

FIG. 5 is a schematic view of a thrust reverser 230 having a support member 270 in accordance with another embodiment of the invention. The illustrated support member 270 includes a first end portion 272a attached directly to a bullnose fairing 246. The thrust reverser 230 further includes an adaptor fitting 274 aligned with the support member 270 and extending between the torque box 148 and the bullnose fairing 246. As such, the load from the support member 270 passes through the adaptor fitting 274 to the torque box 148. The illustrated thrust reverser 230 is accordingly a simpler configuration because it does not include a movable mechanism coupling the support member 270 to the torque box 148.

From the foregoing, it will be appreciated that specific embodiments of the invention have been described herein for purposes of illustration, but that various modifications may be made without deviating from the invention. For example, although the illustrated thrust reverser includes a V-blade and the illustrated fan casing includes a V-groove, in other embodiments, the thrust reverser can include a V-groove or another structure and the fan casing can include a V-blade or another structure to couple the thrust reverser and fan casing together. Moreover, although the support members illustrated in FIGS. 2-5 extend between the nozzle outer wall and an arcuate portion of the nozzle inner wall, in other embodiments the support members may extend between the nozzle outer wall and an upper and/or lower portion of the nozzle inner wall in lieu of or in addition to the support member extending between the nozzle outer wall and the arcuate portion of the nozzle inner wall. Furthermore, aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

I claim:

1. An aircraft system, comprising a thrust reverser including:
   a nozzle inner wall;
   a nozzle outer wall radially outward of the nozzle inner wall, the nozzle outer wall including a blocker door movable between a deployed position and a stowed position;
   a fixed structure positioned radially outward of the nozzle outer wall;
   a link having a first end portion pivotally coupled to the fixed structure and a second end portion spaced apart from the first end portion; and
   a support member extending between the nozzle inner wall and the nozzle outer wall, wherein at least a portion of the support member is positioned forward of the blocker door when the blocker door is in the stowed position, wherein a first end portion of the support member is pivotally attached to the second end portion of the link, and wherein the first end portion of the support member is spaced radially inward from the fixed structure by a gap.

2. The aircraft system of claim 1, wherein the fixed structure is a first torque box, and wherein the aircraft system further comprises a second torque box positioned radially outward of at least a portion of the nozzle outer wall;
   wherein the nozzle inner wall further includes a first inner wall panel and a second inner wall panel opposite the first inner wall panel, the first and second inner wall panels each including an upper portion, a lower portion, and an arcuate portion extending between the upper and lower portions;
   wherein the support member is a first support member having a second end portion attached to the arcuate portion of the first inner wall panel; and
   wherein the aircraft system further comprises a second support member having a first end portion coupled to the second torque box and a second end portion attached to the arcuate portion of the second inner wall.

3. The aircraft system of claim 1 wherein:
   the nozzle inner wall further includes a first inner wall panel and a second inner wall panel opposite the first inner wall panel, the first and second inner wall panels each including an upper portion, a lower portion, and an arcuate portion extending between the upper and lower portions; and
   the support member includes a second end portion attached to the arcuate portion of the first or second inner wall panel.

4. The aircraft system of claim 1, wherein:
   the nozzle inner wall further includes a first inner wall panel and a second inner wall panel opposite the first inner wall panel, the first and second inner wall panels each including an upper portion, a lower portion, and an arcuate portion extending between the upper and lower portions; and
   the support member includes a second end portion attached to the arcuate portion of the first or second inner wall panel.

5. The aircraft system of claim 1 wherein:
   the nozzle inner wall further includes a first inner wall panel and a second inner wall panel opposite the first inner wall panel, the first and second inner wall panels each including an upper portion, a lower portion, and an arcuate portion extending between the upper and lower portions;
   the support member is a first support member;
   the aircraft system further comprises a second support member; and the first and second support members each include an end portion attached to the arcuate portion of the first inner wall panel.

6. The aircraft system of claim 1 wherein the fixed structure is a torque box.

7. The aircraft system of claim 1, further comprising a fan casing including an inner V-groove, wherein the thrust reverser further includes an inner V-blade proximate to the nozzle inner wall for engaging the inner V-groove, and wherein the support member is positioned to at least inhibit disengagement of the inner V-groove and the inner V-blade.

8. The aircraft system of claim 1 wherein the thrust reverser has a central axis, and wherein the support member is elongated along an axis that intersects the central axis.

9. The aircraft system of claim 1, further comprising an urging member operably coupled to the support member and positioned to urge the support member toward the nozzle inner wall.

10. The aircraft system of claim 1, further comprising:
a wing coupled to the thrust reverser;
a fuselage attached to the wing; and
a tail coupled to the fuselage.

11. An aircraft system, comprising a cascade thrust reverser including:
a first inner wall panel;
a second inner wall panel opposite the first inner wall panel with a nozzle gas flow path located between the first and second inner wall panels;
a nozzle outer wall radially outward of the first and second inner wall panels;
a fixed structure radially outward of at least a portion of the nozzle outer wall;
a link having a first end portion pivotally coupled to the fixed structure and a second end portion spaced apart from the first end portion; and
a support member having a first end portion attached to the first or second inner wall panel and a second end portion pivotally attached to the second end portion of the link, wherein the first end portion of the support member is spaced radially inward from the fixed structure by a gap.

12. The aircraft system of claim 11 wherein:
the first inner wall panel includes an upper portion, a lower portion, and an arcuate portion extending between the upper and lower portions; and
the first end portion of the support member is attached to the arcuate portion of the first inner wall panel.

13. The aircraft system of claim 11 wherein:
the fixed structure includes a torque box;
the first inner wall panel includes an upper portion, a lower portion, and an arcuate portion extending between the upper and lower portions; and
the first end portion of the support member is attached to the arcuate portion of the first inner wall panels.

14. The aircraft system of claim 11 wherein the fixed structure includes a torque box.

15. The aircraft system of claim 11 wherein the support member is a first support member attached to the first inner wall panel, and wherein the aircraft system further comprises a second support member extending between the first inner wall panel and the nozzle outer wall.

16. The aircraft system of claim 11 wherein:
the first inner wall panel includes an upper portion, a lower portion, and an arcuate portion extending between the upper and lower portions;
the support member is a first support member and the first end portion of the first support member is attached to the arcuate portion of the first inner wall panel;
the fixed structure is a first fixed structure; and
the aircraft system further comprises (a) a second fixed structure radially outward of at least a portion of the nozzle outer wall, and (b) a second support member having a first end portion attached to the second inner wall panel and a second end portion coupled to the second fixed structure.

17. The aircraft system of claim 11, further comprising a fan casing having an inner V-groove, wherein the thrust reverser further comprises an inner V-blade proximate to the first and second inner wall panels for engaging the inner V-groove, and wherein the support member inhibits disengagement of the inner V-groove and the inner V-blade.

18. An aircraft system, comprising:
a fan casing including a first member; and
a thrust reverser including a nozzle inner wall, a second member proximate to the nozzle inner wall for engaging the first member, a nozzle outer wall radially outward of the nozzle inner wall, a fixed structure positioned radially outward of the nozzle outer wall, and means for inhibiting disengagement of the first and second members, wherein the means for inhibiting comprise:
a link having a first end portion pivotally coupled to the fixed structure and a second end portion spaced apart from the first end portion; and
a support member extending between the nozzle inner wall and the nozzle outer wall, wherein the support member includes an end portion pivotally attached to the second end portion of the link, and wherein the first end portion of the support member is spaced radially inward from the fixed structure by a gap.

19. The aircraft system of claim 18 wherein the nozzle inner wall includes a forward section and the nozzle outer wall includes a forward section, and wherein the support member extends between the forward section of the nozzle inner wall and the forward section of the nozzle outer wall.

20. The aircraft system of claim 18 wherein the first member is an inner V groove and the second member is an inner V-blade.

21. The aircraft system of claim 18 wherein the means for inhibiting comprise a plurality of support members extending between the nozzle inner and outer walls.

22. The aircraft system of claim 18 wherein:
the nozzle inner wall includes a first inner wall panel and a second inner wall panel opposite the first inner wall panel, the first and second inner wall panels each including an upper portion, a lower portion, and an arcuate portion extending between the upper and lower portions; and
the support member extends between the nozzle outer wall and the arcuate portion of the first or second inner wall panel.

23. The aircraft system of claim 18 wherein:
the fixed structure is a torque box;
the nozzle inner wall includes a first inner wall panel and a second inner wall panel opposite the first inner wall panel, the first and second inner wall panels each including an upper portion, a lower portion, and an arcuate portion extending between the upper and lower portions; and
the support member extends between the arcuate portion of the first inner wall panel and the torque box.

* * * * *

UNITED STATES PATENT AND TRADEMARK OFFICE
CERTIFICATE OF CORRECTION

PATENT NO. : 7,600,371 B2  Page 1 of 1
APPLICATION NO. : 11/252444
DATED : October 13, 2009
INVENTOR(S) : Joe E. Sternberger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 867 days.

Signed and Sealed this

Fifth Day of October, 2010

David J. Kappos
*Director of the United States Patent and Trademark Office*